United States Patent [19]
Johnson

[11] Patent Number: 5,198,201
[45] Date of Patent: * Mar. 30, 1993

[54] REMOVAL OF SULPHUR AND NITROGEN OXIDES FROM FLUE GASES

[76] Inventor: Arthur F. Johnson, 240 Fox Dr., Boulder, Colo. 80303

[*] Notice: The portion of the term of this patent subsequent to Jun. 16, 2009 has been disclaimed.

[21] Appl. No.: 731,830

[22] Filed: Jul. 16, 1991

Related U.S. Application Data

[63] Continuation-in-part of Ser. No. 567,492, Aug. 14, 1990, Pat. No. 5,122,352, which is a continuation-in-part of Ser. No. 372,492, Jun. 28, 1989, abandoned, which is a continuation-in-part of Ser. No. 165,312, Mar. 8, 1988, Pat. No. 4,874,585.

[51] Int. Cl.$^5$ ............... C01B 21/00; C01B 17/00; C01B 17/69
[52] U.S. Cl. ............... 423/235; 423/243.01; 423/243.05; 423/512 R; 423/522; 423/545; 165/921; 55/73
[58] Field of Search ........... 423/235, 239, 522, 243.01, 423/243.05, 512 R, 545; 55/73; 165/111, 921; 110/345

[56] References Cited

U.S. PATENT DOCUMENTS

| | | | |
|---|---|---|---|
| 3,920,421 | 11/1975 | Collins | 423/235 |
| 4,452,620 | 6/1984 | Dosmond | 165/921 |
| 4,454,100 | 6/1984 | Faatz | 423/522 |
| 4,487,139 | 12/1984 | Warner | 110/345 |
| 4,582,122 | 4/1986 | Fan | 423/542 |
| 4,597,433 | 7/1986 | Johnson | 55/73 |
| 4,781,797 | 11/1988 | Johnson | 55/73 |
| 4,783,326 | 11/1988 | Srednicki | 423/235 |
| 4,793,981 | 12/1988 | Doyle et al. | 423/239 |
| 4,802,897 | 2/1989 | Johnson | 55/55 |
| 4,871,522 | 10/1989 | Doyle | 423/235 |
| 4,900,403 | 2/1990 | Johnson | 55/73 |

Primary Examiner—Gary P. Straub
Attorney, Agent, or Firm—Pennie & Edmonds

[57] ABSTRACT

A method and apparatus are disclosed for removing pollutants, especially oxides of sulphur and nitrogen, from boiler plant flue gases. A series of heat exchange steps cool the gas and condense acidic condensates. $SO_3$ is removed by condensation, and $SO_2$ is removed by either extraction or a combination of oxidation and condensation.

15 Claims, 2 Drawing Sheets

REMOVAL OF SULPHUR AND NITROGEN OXIDES FROM FLUE GASES

CROSS-REFERENCE TO RELATED APPLICATIONS

This application is a continuation-in-part of application Ser. No. 07/567,492, filed Aug. 14, 1990 now U.S. Pat. No. 5,122,352 which is a continuation-in-part of application Ser. No. 07/372,492, filed Jun. 28, 1989 now abandoned which is a continuation-in-part of application Ser. No. 07/165,312, filed Mar. 8, 1988, now U.S. Pat. No. 4,874,585.

FIELD OF THE INVENTION

This invention relates to an apparatus and method for exchanging heat and removing pollutants from boiler plant flue gas.

BACKGROUND OF THE INVENTION

Numerous systems for removing pollutants from boiler plant flue gases are known in the art. The need for such systems has become particularly acute in recent years, as environmental concerns have become more prevalent.

Prior art on the chemistry of the manufacture of acids of sulphur and their influence on oxides of nitrogen is very old, dating back to 1797 in the United States with John Harrison's manufacture in Philadelphia. The theories and practice are described in "The Manufacture of Sulphuric Acid" (W. Duecker and J. West eds. 1959).

The chemical reactions involved in this patent application are described on pages 178 and 694 of F. Ephram, "Inorganic Chemistry" (P. Thorne and E. Roberts 4th ed. 1943). U.S. Pat. No. 3,920,421 further reflects the general knowledge regarding the interaction of sulphur dioxides and nitric oxides, but no known prior art recovered merchantable products of sulphuric acid and sulphur dioxide and ammonium salts therefor while simultaneously recovering flue gas heat in boiler feedwater.

Among the prior art systems are those which employ heat exchanger apparatus to cool flue gases and collect the condensate, which contains pollutants from the gases. By removing the condensate, pollutants are also removed. Examples of such techniques are seen in U.S. Pat. No. 4,876,986 to Johnson, which employs rotating rock beds to transfer heat, and U.S. Pat. No. 4,597,433 to Johnson, which employs large size pebble beds to transfer heat.

Many of the prior art systems were developed in response to a demand for increased energy efficiency. These systems were primarily concerned with the heat exchange processes, rather than the pollutant removal processes. This segment of the art is reflected in a series of patents issued to Mr. Donald Warner and assigned to Heat Exchanger Industries, Inc., including U.S. Pat. Nos. 4,487,139, 4,526,112, and 4,557,202. These patents recognize and utilize the technique of condensing acidic pollutants, especially sulphuric acid ($H_2SO_4$), from the flue gas.

Condensation of $H_2SO_4$ occurs as a result of the combination of water and sulphur trioxide, according to the following equation:

$$H_2O + SO_3 \rightarrow H_2SO_4$$

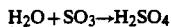

$SO_3$ is a well-known and highly effective desiccant, and as long as water is present the two will combine and, if cooled, condense. Flue gas typically contains $SO_2$ as well as $SO_3$, however, and $SO_2$ does not readily combine with $H_2O$. It has therefore been a further practice in the art to oxidize the $SO_2$ pollutants to $SO_3$ for subsequent removal by condensation. This procedure is shown for example, by U.S. Pat. No. 4,910,011.

Prior art systems that remove pollutants by heat exchange and condensation also do not address the effect of particulate pollutants, such as fly ash, on the oxidization and removal of sulphuric pollutants. Some references employ sprays of water or a large amount of condensation, as in U.S. Pat. No. 4,487,139, to wash particulate matter from the heat exchanger and keep the exchanger in efficient operating order. However, none of the references appreciates the deleterious effect of fly ash and other poisonous particulates on the oxidization process, or provides a method of effectively and efficiently removing pollutants by heat exchange without comprised performance.

Although it is known in the prior art that flue gas condensation contains pollutants, and that causing such condensation is one way to remove pollutants, an effective system has not been developed which both removes substantially all pollutants and is capable of being readily retrofit onto existing power plant systems.

It is therefore a general object of the invention to provide a more efficient heat exchange between boiler plant flue gas and boiler feedwater flowing through tubes disposed in the flue gas.

A further objective is to achieve a more perfect removal of sulphur and nitrogen oxides, as well as aerosols and particulates, from the flue gas.

An additional object of this invention is to provide a method of removing pollutants in which the oxidization of $SO_2$ to $SO_3$ is uninhibited by the presence of particulate pollutant material such as fly ash.

It is another object of the invention to provide such a method of removing pollutants by heat exchange in which particulate materials are prevented from negatively affecting the performance of the heat exchange step.

A further objective is to make commercially valuable byproducts from the condensate that is produced when the flue gas of fossil-fuel fired boilers is cooled.

SUMMARY OF THE INVENTION

U.S. patent application Ser. No. 07/567,492 is hereby expressly incorporated by reference herein for its disclosure of a heat exchanger in which, among other things, sulphur dioxide can be recovered more completely than before, by recirculating part of a condensate either before or after vacuum extraction of the sulphur dioxide therefrom. According to one embodiment of the present invention, better extraction of sulphuric acid and nitric oxide is achieved by the recirculation of sulphuric acid which either dissolves or reacts with oxides of nitrogen and sulphur, producing more sulphur-containing acid from flue gas than without recirculation of sulphuric acid.

In the same embodiment, the present invention avoids addition of ammonia except in extremely small amounts after all possible sulphuric acid and sulphur dioxide have been removed, and then only to the extent that any nitric oxide remains. The nitric oxide combines with ammonia to form nitrogen and water according to the reaction: $6NO + 4NH_3 \rightarrow 5N_2 + 6H_2O$. This reaction is best promoted with condensate under vacuum, since nitrogen is nearly insoluble in water and removal of a component in any reaction promotes the reaction.

Alternately, at least part of the nitric oxide may be treated by the addition of iron sulphite. Iron sulphite can be conveniently produced by allowing the condensate to react with scrap iron after the sulphuric acid has been removed from the condensate, and before the sulphur dioxide has been removed from the condensate by vacuum treatment. Reaction of nitric oxide with iron sulphite proceeds according to the formula: $2NO + FeSO_3 \rightarrow FeSO_4 + N_2$.

Thus this invention removes substantially all noxious pollutants in flue gas in one principal apparatus including a heat exchanger that preheats boiler feedwater with sensible and condensation heat of the flue gas. To eliminate air pollution, there is a demand for a compact apparatus that can be retrofit to existing power plants and repay its cost of installation by energy savings and profitable byproducts like sulphuric acid, ammonium bisulphate and liquid sulphur dioxide produced from burning high-sulphur coal and oil.

The apparatus of the present invention includes components of acid-proof, well-proven, conventional flue gas heat exchangers which heat boiler feedwater. These are provided in such an arrangement, and are so compact in size, that they can be retrofit to any power plant to both eliminate practically all flue gas contaminants and simultaneously improve power plant heat rate (KWH/Btu in fuel fired). Accordingly, it is possible to either produce more power or produce the same amount with 6%-10% less fuel. It produces "acid rain" in the heat exchangers and converts it to merchantable products such as sulphuric acid, liquid sulphur dioxide, and ammonium bisulphate fertilizers.

DETAILED DESCRIPTION OF THE PREFERRED EMBODIMENTS

The present invention employs a multi-stage heat exchanger apparatus in which substantially undiluted sulphuric acid is condensed and removed in a first heat exchange stage. This step is the result of the combination of $SO_3$ and $H_2O$ in the flue gas in accordance with the formula: $SO_3 + H_2O \rightarrow H_2SO_4$.

The second stage is primarily concerned with the removal of $SO_2$, which will not have combined with $H_2O$ in the first stage. In the embodiment represented by FIG. 1, the flue gas is further cooled in a second heat exchange step, and a condensate containing dissolved $SO_2$ is collected. The $SO_2$ is then extracted from the collected condensate.

Figure 1:
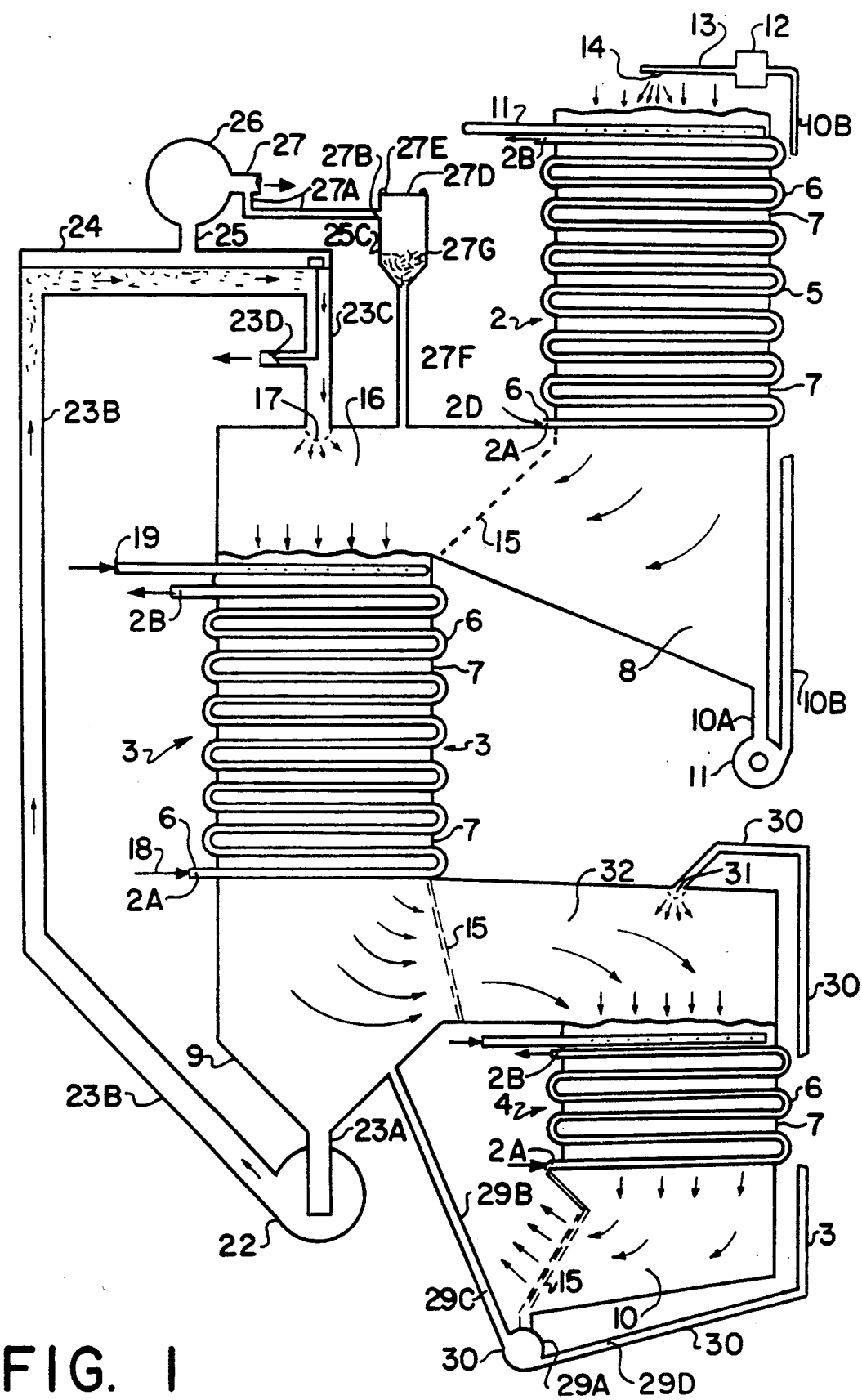
FIG. 1 is a vertical cross section through a first embodiment of a flue gas heat exchanger and pollutant remover of the invention.

The invention may be best understood by reference to FIG. 1 where sections 2, 3 and 4 are acid-proof heat exchangers through which the flue gas of a power plant is drawn by a conventional induced draft fan (not shown) located between the exchangers and the flue gas exhaust stack. Each section houses a multiplicity of closely spaced, acid-proof horizontal tubes 6 enclosed in acid-proof fiberglass casing 7 down through which hot flue gas is drawn. Preferably, the tubes are coated with Teflon (polytetrafluorethylene).

Condensate collection sumps 8, 9 and 10 are located beneath each respective section 2, 3 and 4 to collect the "acid rain" formed by the exchangers. At each collection location, a 90 degree change is effected in the direction of the flue gas, which travels at about 5 to 15 feet per second.

The power plant boiler feedwater, at its lowest temperature after going through the massive heat exchange in the power plant steam condenser, enters heat exchanger section 2 at its uppermost tube 11 and exits as hot feedwater for the conventional feedwater pumps. Flue gas moves vertically downward into section 2 at a temperature preferably about 500° F., which is about the upper limit for the Teflon coating on the tubes. However, durable cast iron tubes within cast iron castings have been used at temperatures higher than 500° up to 700° F.

Ideally section 2 cools the flue gas to about 200° F., whereby 98.3% $H_2SO_4$ condenses at 626° F., $H_2SO_4 \cdot H_2O$ condenses at 554° F., and $H_2SO_4 \cdot 4H_2O$ condenses at 334° F. These acids collect in sump 8, from which they are withdrawn via pipe 10A into acid pump 11, and lifted up pipe 10B through filter apparatus 12. Noxious insoluble sulphates and fly ash are removed at filter 12, together with a selected amount of sulphur compounds in any form which have been condensed from the flue gas. Up to 10 times the amount of condensate removed at filter 12 is recirculated via pipe 13 to spray nozzle 14 where the hot flue gas entering the top of section 2 tends to concentrate it. Preferably, nozzle 14 returns the sulfuric acid to flue gas having a temperature above 650° F.

Sulphuric acid recirculation according to this invention cooperates with naturally occurring reactions in the flue gas to maximize the amount of sulphuric acid yielded and thus removed from the flue gas, and at the same time to remove oxides of nitrogen from the flue gas. This is accomplished based on reactions that can remove the two prevalent oxides of nitrogen. First, sulphuric acid dissolves NO, as taught by W. Duecker & J. West, The Manufacture of Sulphuric Acid, Am. Chem. Soc. Mono. No. 144 (1959). Second, sulphur dioxide combines with $NO_2$ and water in the flue gas to form sulphuric acid and NO, according to the reaction: $NO_2 + SO_2 + H_2O \rightarrow H_2SO_4 + NO$. The NO thus produced can be dissolved by the other reaction product, $H_2SO_4$, as stated above. Recirculation of sulphuric acid accordingly advances the complete removal of oxides of nitrogen, in cooperation with the naturally occurring combination of $SO_2$ and $NO_2$.

Before entering section 3 the flue gas is demisted in sump 8 of section 2 by screens 15 of the type used by sulphuric acid producing plants for many years. Screens 15 may be made of any acid-resistant material capable of withstanding the temperature of the flue gas where the screens are located. Stainless steel is suitable, although nylon may be used below about 500° F. The flue gas then enters the dome 16 of section 3 where a recirculating stream of condensate from sump 9 is sprayed by nozzle 17 at a rate of flow several times that at which the condenser 3 condenses water from the flue gas. The coldest boiler feedwater available enters section 3 at condenser tube 18, leaves at tube 19, and is then directed to section 2, entering at tube 20 and leaving at tube 11. The feedwater stream is then fed to power plant feedwater pumps to be heated by wet steam from steam turbines according to conventional practice.

The purpose of section 3 is to dissolve sulphur dioxide in the flue gas condensate and vacuum extract it therefrom to separate the sulphur dioxide vapor from the condensate. Since water in the condensate will dissolve 22% of its weight of sulphur dioxide at 32° F. but only 7.8% at 86° F., it is important that the coldest boiler feedwater available be used to cool the flue gas. Condensate from section 3 is recirculated from sump 9 via downpipe 32A into acid-proof pump 22, then through pipe 23B into condensate reservoir 24 from which sulphur dioxide is extracted by vacuum pump 26 via intake pipe 25 and outlet pipe 27. Some $SO_2$ bubbles will form in pipe 23B and lessen the energy needed by pump 22.

The recirculated water in reservoir 24 leaves via downpipe 23C and is sprayed into the flue gas in dome 16 of section 2 by spray device 17. It should be noted that downpipe 23C is longer than 32 feet to overcome atmospheric pressure and provide pressure on the spray device to make it operable. The amount of condensate released to waste will at most be that produced by sections 3 and 4, and may be governed by a float valve 23D in pipe 23C.

The general principles of the vacuum extraction process, and additional suitable embodiments for its execution, are disclosed in the present inventor's U.S. Pat. Nos. 4,802,897 and 4,781,979, the contents of which are expressly incorporated by reference herein.

Substantially all the sulphur acids and $NO_x$ would be removed by the methods described, but the invention further provides that as much ferrous sulphite as needed can be used to convert any remaining NO to nitrogen by the aforementioned reaction $2FeSO_3 + 2NO \rightarrow N_2 + FeSO_4$. Ferrous sulfite can be prepared as part of the disclosed system in a small sidestream of the sulphur acids removed by vacuum pump 26 from reservoir 24. The ferrous sulfite is then fed into the enclosure to mix with the flue gas at a location between section 2 and section 3. Scrap iron may be used to make the reaction $Fe + SO_2 + H_2O \rightarrow FeSO_3 + H_2$. The hydrogen gas has no effect at these lower temperatures and in the face of enormous dilution by flue gas, but the iron sulphite goes into solution where it decomposes NO. This is accomplished by feeding the side stream making $FeSO_3$ into the top of section 3 whereby the recirculating condensate makes contact with the flue gas flow.

A preferred embodiment of the ferrous sulphite apparatus is shown in FIG. 1. A pipe 27A carries a side stream of $SO_2$ from the vacuum 26 via pipe 27. Valve 27B requires flow of the $SO_2$ into a hopper 27C, which has an airtight cover 27D hinged at 27E. Hopper 27c contains a reservoir of $H_2O$ at as low a temperature as possible (solubility of $SO_2$ is greater at lower temperatures). Hopper 27C also contains scrap iron 27G, which reacts with the water and sulphur dioxide as described above to produce $FeSO_3$. The ferrous sulphite product drains through pipe 27F into the upper part 16 of section 3.

Both sulfites and sulphates are usually present in the flue gas. Sulfites may be oxidized into sulphates by the presence of impurities in the flue gas. The present invention effects the removal of both sulfites and sulphates in a single, retrofittable apparatus.

The circulation rates in either section 2 or 3 are selected to achieve beneficial results, and this selection can be handled by sensors and automatic controls, as is generally known by one skilled in the art.

The purpose of section 4 is to cool the flue gas to a lower temperature than possible with boiler feedwater by employing the coldest available river, lake or well water. The resulting condensate in sump 10 of section 4 drains via downpipe 29A into recirculating pump 30. When valve 29D is open, the condensate passes up riser pipe 30 to spray 31 which cools the flue gases and improves heat exchange between the gases and the heat exchanger of section 4. Water-to-tube contact is more efficient in heat exchange than gas-to-tube contact. Valve 29C in pipe 29B is automatically kept open so just enough condensate is released from section 4 as is being produced there.

The vacuum evaporation of sulphur dioxide and water from reservoir 24 by vacuum pump 26 results in cooling the recirculating condensate by the heat of evaporation of water (1,000 Btu/lb) and $SO_2$ (about 144 Btu/lb). This obviously increases the efficiency of the process of this invention.

Finally, if NO has not been entirely removed by recirculation of sulphuric acid or addition of $FeSO_3$, then just enough ammonium hydroxide ($NH_4OH$) may be added to the recirculating condensate of section 4 to accomplish this by the reaction previously cited.

The invention described above removes substantially all oxides of sulphur and nitrogen from a flue gas flow. To ensure successful operation of the invention, however, it is recommended that large particulates such as fly ash be removed from the flue gas upstream of the first heat exchanger.

Figure 2:
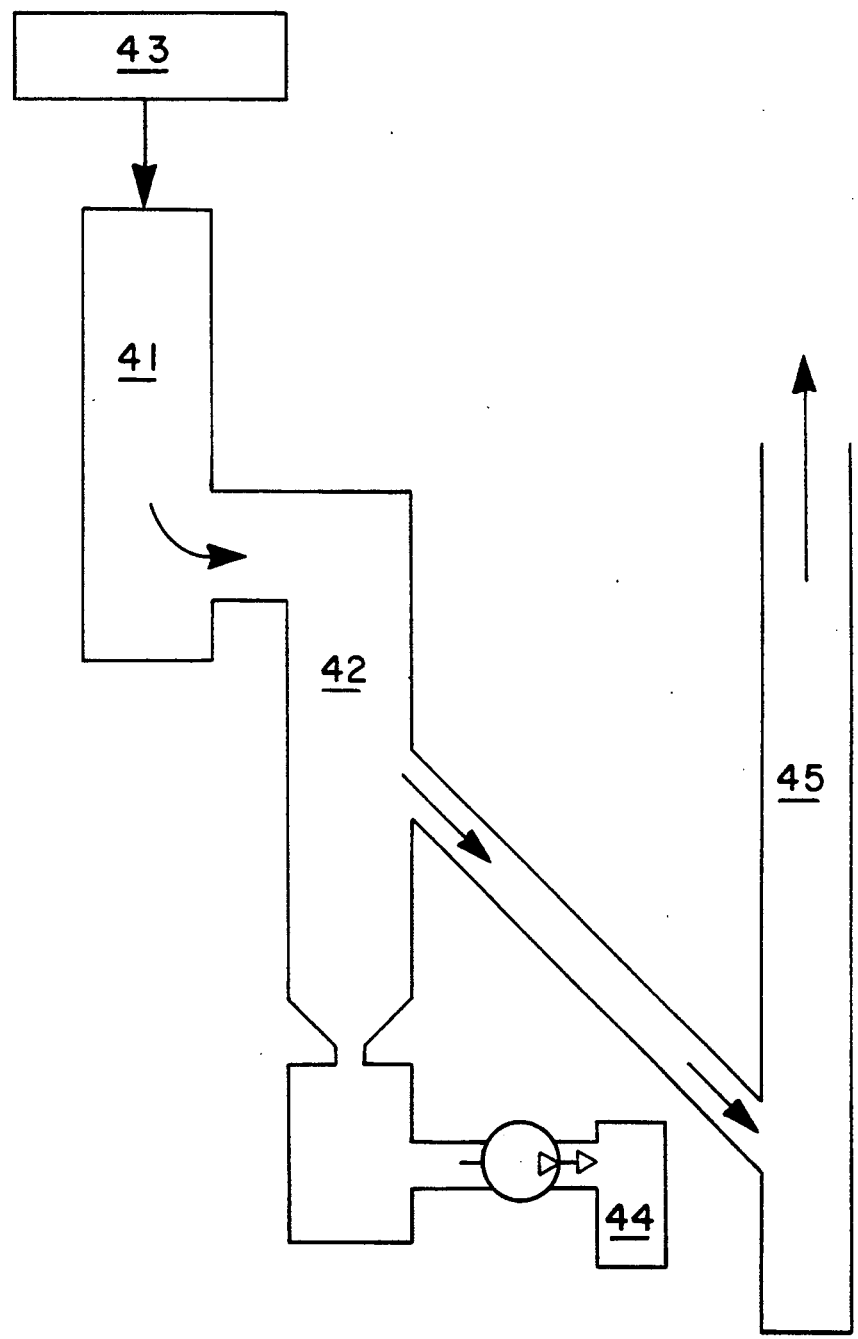
FIG. 2 is a flow sheet showing a typical arrangement of the invention within a power plant system.

FIG. 2 is a flow chart illustrating a typical arrangement of the invention within a power plant system. The embodiment of FIG. 2 has two heat exchanger sections 41, 42. As indicated on FIG. 2, a bag house 43 can be used to remove the ash from the flue gas prior to the first heat exchanger. Removing the ash ensures that the chemical reactions in the heat exchanger sections of the invention can proceed uninhibited by the presence of the ash.

FIG. 2 shows several additional features that may optionally be added to the system disclosed earlier. A tank 44 may be used to collect the $SO_2$ extracted by vacuum, and to produce $(NH_4)_2SO_4$, a merchantable fertilizer product. This is accomplished by combining the extracted $SO_2$ with water, oxygen, and ammonium hydroxide according to the following reactions:

$$2SO_2 + 2H_2O + O_2 \rightarrow 2H_2SO_4$$

$$H_2SO_4 + 2NH_4OH \rightarrow (NH_4)_2SO_4 + 2H_2O$$

In addition, the flue gas can be led through a second bag house 45 after it has passed through the first and second heat exchangers. Ammonia is added to the flue gas just before the second bag house. The ammonia combines with any remaining oxides of sulphur and nitrogen in the flue gas to form ammonium sulphates, ammonium sulphites and ammonium nitrites.

Preferably, the bags in the second bag house are coated with an alumina powder, which acts as a catalyst for the combination of ammonia with the pollutants by increasing the surface area past which the substances flow. Intermittently, the bags are pulsed to remove collected pollutants and catalyst that become caked on the bag surfaces.

I claim:

1. A method for removing pollutants from boiler plant flue gas, comprising:

indirectly cooling the flue gas with a first fluid to cool the flue gas to a first temperature below the condensation point of sulfuric acid but above the condensation point of water and to combine substantially all $SO_3$ in the flue gas with $H_2O$ to form sulfuric acid;

removing the sulfuric acid from the flue gas as a first condensate;

collecting the first condensate;

continuously introducing at least a part of the first condensate into flue gas prior to the first indirect heat exchange step to improve removal of pollutants and heat exchange in the flue gas; and indirectly exchanging heat between the flue gas and a second fluid to cool the flue gas to a second temperature heat exchange step to condense $H_2O$ from the flue gas as a second condensate while dissolving $SO_2$ in the flue gas in the second condensate.

2. The method of claim 1, which further comprises:
collecting the second condensate; and
extracting the $SO_2$ from the second condensate.

3. The method of claim 2, wherein the extracting step comprises:

circulating the second condensate to a reservoir;

applying vacuum pressure to the reservoir above the second condensate;

combining at least part of the extracted $SO_3$ with metallic iron to produce ferrous sulfite; and introducing at least part of the ferrous sulfite produced in said combining step to flue gas that has undergone the first indirect heat exchange step but that has not yet undergone the second temperature heat exchange step.

4. The method of claim 2, which further comprises providing ferrous sulfite to the second condensate to decompose oxides of nitrogen in the second condensate.

5. The method of claim 4, which further comprises producing the ferrous sulfite by reacting metallic iron with a sulphurous acid and collecting ferrous sulfite formed by the reaction.

6. The method of claim 5, wherein said ferrous sulfite producing step includes producing at least part of the sulphurous acid from the sulphur dioxide extracted during said sulphur dioxide extracting step.

7. The method of claim 2, wherein the first indirect heat exchange step and the first condensate collecting step are performed over a first vertical flue gas flue path, the second temperature heat exchange step and the second condensate collecting step are performed over a second vertical flue gas flow path, and which further comprises effecting at least one directional change between the first and second vertical flue gas flow paths to prevent the first condensate from passing directly into the second temperature heat exchange step.

8. The method of claim 7, which further comprises adding ammonia to the flue gas that has undergone the second indirect heat exchange step in an amount sufficient to react with substantially all remaining oxides of nitrogen in the flue gas to produce nitrogen and water.

9. The method of claim 2, which further comprises indirectly exchanging heat between the flue gas and a third fluid, to cool the flue gas to a third indirect, after the second temperature heat exchange step, to condense $H_2O$ from the flue gas as a third condensate and to further dissolve $SO_2$ in the flue gas in the third condensate; and collecting the third condensate.

10. The method of claim 9, which further comprises the step of introducing at least a part of the third condensate to flue gas that has undergone the second indirect heat exchange step but that has not yet undergone the third indirect heat exchange step.

11. The method of claim 9, wherein the first indirect heat exchange step and the first condensate collecting step are performed over a first vertical flue gas flow path, the second indirect heat exchange step and the second condensate collecting step are performed over a second vertical flue gas flow path, the third indirect heat exchange step and the third condensate collecting step are performed over a third vertical flue gas flow path, and which further comprises effecting at least one directional change between the first and second vertical flue gas flow paths to prevent the first condensate from passing directly into the second indirect heat exchange step, and effecting at least one directional change between the second and third vertical flue gas flow paths to prevent the second condensate from passing directly into the third cooling step.

12. The method of claim 2, which further comprises removing particulate material including fly ash from the flue gas prior to the first temperature heat exchange step.

13. The method of claim 12, which further comprises introducing ammonia to the flue gas after the second temperature heat exchange step, and passing the flue gas through a bag house while reacting residual oxides of nitrogen and sulphur in the flue gas with the ammonia.

14. A method for removing pollutants from boiler plant flue gas, comprising:

indirectly cooling the flue gas with a first fluid to cool the flue gas to a first temperature and combine substantially all $SO_3$ in the flue gas with $H_2O$;

condensing the $SO_3$ and $H_2O$ from the flue gas as a first condensate to form sulfuric acid;

collecting the first condensate;

indirectly cooling the flue gas with a second fluid to cool the flue gas to a second temperature, after the first indirect heat exchange step, to condense $H_2O$ from the flue gas as a second condensate and dissolve $SO_2$ in the flue gas in the second condensate to form sulfurous acid;

collecting the second condensate;

extracting the $SO_2$ from the second condensate;

collecting the $SO_2$ extracted from the second condensate;

reacting at least a portion of the extracted $SO_2$ with water and oxygen to form sulfuric acid; and adding ammonium hydroxide to at least a portion of the sulfuric acid produced during said combining step to produce $(NH_4)_2SO_4$.

15. The method of claim 14, which further comprises adding oxygen to at least a portion of the extracted $SO_2$ to oxidize said extracted $SO_2$ to $SO_3$.

* * * * *